United States Patent
Kojima et al.

(10) Patent No.: US 8,998,213 B2
(45) Date of Patent: Apr. 7, 2015

(54) MECHANICAL SEAL DEVICE AND PROCESSING APPARATUS

(75) Inventors: Takeshi Kojima, Kanagawa (JP); Shinichi Yamagami, Kanagawa (JP)

(73) Assignee: JGC Corporation, Tokyo (JP)

( * ) Notice: Subject to any disclaimer, the term of this patent is extended or adjusted under 35 U.S.C. 154(b) by 0 days.

(21) Appl. No.: 13/261,089

(22) PCT Filed: Jul. 22, 2010

(86) PCT No.: PCT/JP2010/004696
§ 371 (c)(1), (2), (4) Date: Dec. 19, 2011

(87) PCT Pub. No.: WO2011/018879
PCT Pub. Date: Feb. 17, 2011

(65) Prior Publication Data
US 2012/0127825 A1    May 24, 2012

(30) Foreign Application Priority Data
Aug. 10, 2009    (JP) .................................. 2009-185863

(51) Int. Cl.
*F16J 15/34* (2006.01)
*B01F 7/18* (2006.01)
*F16J 15/40* (2006.01)

(52) U.S. Cl.
CPC .............. *F16J 15/3484* (2013.01); *B01F 7/18* (2013.01); *F16J 15/40* (2013.01)

(58) Field of Classification Search
CPC .................................................. F16J 15/3484
USPC ................................................ 277/400–401
See application file for complete search history.

(56) References Cited

U.S. PATENT DOCUMENTS 1,020,210 A * 3/1912 Lobnitz .......................... 384/139
3,070,377 A * 12/1962 Eickmann ...................... 277/507

(Continued)

FOREIGN PATENT DOCUMENTS

| JP | 2001-021045 | 1/2001 |
| JP | 2004-263802 | 9/2004 |
| JP | 2005-133852 | 5/2005 |

OTHER PUBLICATIONS

Microfilm of the specification and drawings annexed to the request of Japanese Utility Model Applicaiton No. 173670/1987 (Laid-open No. 78277/1989) (H1-78277) (Kabushiki Kaisha Nakamura Kinzoku Kogyosho), May 25, 1989, p. 8, lines 8 to 20; fig. 1 (Family: none).

*Primary Examiner* — David Sorkin
*Assistant Examiner* — Abbas Rashid
(74) *Attorney, Agent, or Firm* — Jordan and Hamburg LLP

(57) ABSTRACT

A mechanical seal device in which, between a processing equipment which performs processing under a sterile condition and a rotary shaft used with its one end inserted in the processing equipment from an atmosphere side, seal parts are disposed outside the processing equipment at least at two places along a length direction of the rotary shaft from the processing equipment side toward the atmosphere side seals the rotary shaft, and when the inside of the processing equipment and the seal parts are sterilized, the atmosphere-side seal part is also easily and surely sterilized similarly to the other seal part. An airtight area is provided on an atmosphere side of an atmosphere-side seal part so that an area communicating with the atmosphere-side seal part is kept airtight all along a circumferential direction of a rotary shaft, and sterilizing gas supplied to a sealing fluid supplied area, which is an area between the rotary shaft and a device main body of the mechanical seal device, in order to sterilize the seal parts is retained in the airtight area.

8 Claims, 8 Drawing Sheets

(56) References Cited

U.S. PATENT DOCUMENTS

| | | | |
|---|---|---|---|
| 3,433,489 A * | 3/1969 | Wiese | 277/401 |
| 3,506,276 A * | 4/1970 | Petersen et al. | 277/364 |
| 3,582,089 A * | 6/1971 | Amorese | 277/364 |
| 3,589,738 A * | 6/1971 | Tracy | 277/397 |
| 3,813,103 A * | 5/1974 | Wiese | 277/401 |
| 4,174,843 A * | 11/1979 | Arena et al. | 277/364 |
| 4,523,764 A * | 6/1985 | Albers et al. | 277/400 |
| 4,961,678 A * | 10/1990 | Janocko | 415/170.1 |
| 5,171,023 A * | 12/1992 | Scott et al. | 277/401 |
| 6,059,293 A * | 5/2000 | Azibert et al. | 277/358 |
| 6,142,478 A * | 11/2000 | Pecht et al. | 277/400 |
| 6,386,547 B2 | 5/2002 | Wu et al. | |
| 6,517,077 B1 | 2/2003 | Enomura | |
| 6,789,804 B2 * | 9/2004 | Wilhelm | 277/390 |
| 7,229,076 B2 * | 6/2007 | Kudari et al. | 277/361 |
| 7,673,479 B2 * | 3/2010 | Dahlheimer | 68/5 E |
| 2004/0173971 A1 | 9/2004 | Kudari et al. | |
| 2006/0261559 A1 | 11/2006 | Kudari et al. | |

* cited by examiner

PRIOR ART

MECHANICAL SEAL DEVICE AND PROCESSING APPARATUS

BACKGROUND OF THE INVENTION

The present invention relates to a mechanical seal device which, between a processing equipment where to perform processing under a sterile condition and a rotary shaft used with one end thereof inserted in the processing equipment, seals the rotary shaft and is provided between the processing equipment and the atmosphere, and to provide a processing apparatus.

As a known processing apparatus for agitating, as shown in FIG. 9 for example, a treatment solution or the like, known is an apparatus in which the treatment solution is stored in a processing equipment 100, a rotary shaft 101 provided with, for example, an impeller at its one end is inserted in the processing equipment 100 from an atmosphere side, and the rotary shaft 101 is rotated around its axis by a motor or the like connected to the other side of the rotary shaft 101 to agitate the treatment solution. The aforesaid agitation process is sometimes performed while unwanted bacteria are prevented from getting mixed in the treatment solution, as in, for example, the preparation of an injection solution, or chemical processes such as cell incubation and crystallization for obtaining sterile powder. In performing such a process in the aforesaid apparatus, the inside of the processing equipment 100, the rotary shaft 101 (impeller), and so on are sterilized with sterilizing gas such as, for example, saturated steam, for example, before the treatment solution is charged into the processing equipment 100, or before the process is started after the treatment solution is charged into the processing equipment 100. For this sterilization, for example, the saturated steam at 100° C. or higher is sufficiently supplied in order to surely sterilize the apparatus.

A known method used in the aforesaid apparatus to seal the rotary shaft 101 relative to the processing equipment 100 and airtightly seal a gap between an inner area of the processing equipment 100 and the air atmosphere is, for example, a method using a mechanical seal 101 or the like as described in Patent Documents 1, 2. This mechanical seal 102 includes seal members 103, 104 on the processing equipment 100 side and the rotary shaft 101 side respectively, having seal surfaces that seal on each other along a circumferential direction of the rotary shaft 101, and seals the rotary shaft 101 which rotates around its axis relative to the processing equipment 101, by making these seal surfaces seal on each other. In FIG. 9, 105 denotes a housing (casing) housing these seal members 103, 104.

Further, for the purpose of airtightly sealing the gap between the inside of the processing equipment 110 and the air atmosphere, preventing the friction between the seal members 103, 104, and letting out heat generated by the sliding, a sealing fluid, for example, a sealing gas or the like is supplied to a seal part 110 which is an area between the seal surfaces of these seal members 103, 104. At this time, a pressure in an area supplied with the sealing gas is sometimes set higher than an inner pressure of the processing equipment 100 in order to prevent the treatment solution or the like from leaking out from the processing equipment 100 via the seal part 110. Concretely, the seal members 103, 104 are disposed so that the aforesaid seal part 110 is formed at, for example, two places along a length direction of the rotary shaft 101 to form a double mechanical seal, and from a sealing fluid supply path 107, the sealing gas having a higher pressure than the inner pressure of the processing equipment 100 is supplied to a sealing fluid supplied area 106, which is an airtight area in a ring shape formed at a position that is between these seal parts 110 and between the rotary shaft 101 and the casing 105. Therefore, the sealing gas supplied to the sealing fluid supplied area 106 slightly enters the inside of the processing equipment 100 via the seal part 110 on the processing equipment 100 side and leaks out to the atmosphere side via the atmosphere-side seal part 110.

Therefore, in a process that is performed while unwanted bacteria are prevented from entering the processing equipment 100 as described above, clean gas is also used as the sealing gas. Further, in order to prevent unwanted bacteria from entering the processing equipment 100 via inner wall surfaces of areas where the sealing gas flows (the sealing fluid supplied area 106 and the sealing fluid supply path 107), these areas are also sterilized by the supply of the aforesaid saturated steam from the sealing fluid supply path 107 to the sealing fluid supplied area 106 at the time of the sterilization of the processing equipment 100 and the rotary shaft 101. Accordingly, the seal part 110 on the processing equipment 100 side out of the aforesaid two seal parts 110 is supplied with the saturated steam both from an inner peripheral side (the processing equipment 100 side) and an outer peripheral side (the sealing fluid supplied area 106 side), so that the temperature and pressure of the saturated steam in this seal part 110 are maintained, ensuring the sterilization of the seal part 110 under the same sterilization condition as that in the processing equipment 100.

As for the atmosphere-side seal part 110 (opposite the processing equipment 100), since an atmosphere of an area to which the steam leaks from this seal part 110 is, for example, the air atmosphere, the saturated steam leaking from the sealing fluid supplied area 106 to the air atmosphere gradually decreases in temperature and pressure to be condensed, so that its sterilizing operation weakens. Therefore, it cannot be said that the seal part 110 adjacent to the atmosphere is sterilized on the same level as that for the seal part 110 on the processing equipment 100 side.

However, since the seal part 110 adjacent to the atmosphere communicates with an inner atmosphere of the processing equipment 100 via the sealing fluid supplied area 106 and the seal part 110 on the processing equipment 100 side, the atmosphere-side seal part 110 also needs the sterilization process on the same level as that of the seal part 110 on the processing equipment 100 side in order to surely prevent unwanted bacteria from entering the processing equipment 100. A possible method to sterilize this atmosphere-side seal part 110 on the same level as that for the seal part 110 on the processing equipment 100 side is to set the temperature and pressure of the steam supplied to the sealing fluid supplied area 106 higher than values necessary for the sterilization so that the temperature and pressure necessary for the sterilization are maintained even when, for example, the temperature and pressure decrease due to the leakage of the steam from this seal part 110, but this requires an additional amount of energy for heating the steam, and necessitates imparting high heat resistance to members forming the mechanical seal 102, which leads to a cost increase of the apparatus. Further, providing a heat-insulating cover covering the whole mechanical seal as described in Patent Document 3 requires an extremely high heat energy.

Another known method is to dispose the aforesaid mechanical seal at three places along the length direction of the rotary shaft, but the seal part adjacent to the atmosphere is not sterilized, either, on the same level as that for the seal part 110 on the processing equipment 100 side.

PRIOR ART DOCUMENT

Patent Document

Patent Document 1 Japanese Patent Application Laid-open No. 2004-263802
Patent Document 2 Japanese Patent Application Laid-open No. 2001-21045
Patent Document 3 Japanese Patent Application Laid-open No. 2005-133852 (FIG. 1)

SUMMARY OF THE INVENTION

The present invention was made under such circumstances and has an object to provide a mechanical seal device in which, between a processing equipment where to perform processing under a sterile condition and a rotary shaft used with one end thereof inserted in the processing equipment from an atmosphere side, seal parts are disposed at least at two places along a length direction of the rotary shaft from the processing equipment side toward the atmosphere and which seals the rotary shaft and keeps the gap between the processing equipment and the atmosphere airtight, wherein at the time of the sterilization of the inside of the processing equipment and the seal parts, the atmosphere-side seal part can be easily and surely sterilized similarly to the other seal part, and to provide a processing apparatus.

A mechanical seal device of the present invention is a mechanical seal device which seals a rotary shaft inserted in a processing equipment where to perform processing under a sterile condition and which is provided between the processing equipment and an atmosphere, the device including:

rotary shaft-side seal surfaces disposed at least at two places apart from each other in a length direction of the rotary shaft and each provided along a plane intersecting with the length direction of the rotary shaft to extend along a whole circumference of the rotary shaft;

casing-side seal surfaces which are provided along an inner circumference of a casing disposed to cover a periphery of the rotary shaft, and seal with the rotary shaft-side seal surfaces;

a biasing means provided for at least one of pairs of the rotary shaft-side seal surfaces and the casing-side seal surfaces and biased so as to press one of the seal surfaces against the other seal surface, to make a space between the casing and the rotary shaft airtight;

a sealing fluid supply port provided in the casing to let a sealing fluid supplied to a space that is between the rotary shaft and the casing and is between one pair and another pair of the rotary shaft-side seal surfaces and the casing-side seal surfaces and to let the sealing fluid flow in gaps between the rotary shaft-side seal surfaces and the casing-side seal surfaces;

a sterilizing gas supply port provided in the casing to let sterilizing gas supplied to the space between the one pair and the other pair of the seal surfaces and to let the gas flow in the gaps between the rotary shaft-side seal surfaces and the casing-side seal surfaces;

a sealing member which includes: a surrounding member surrounding a space that communicates with the gap between the seal surfaces of the pair located on a most downstream side in a flow direction of the sealing fluid out of the pairs of the rotary shaft-side seal surfaces and the casing-side seal surfaces and that is located on a downstream side of the gap in the flow direction of the sealing fluid; and a seal member sealing a gap between the surrounding member and the rotary shaft, the surrounding member and the seal member being capable of making the space on the downstream side an airtight area; and a discharge port opened to the airtight area to discharge the sealing fluid or the sterilizing gas.

Preferably, the sterilizing gas is saturated steam or sterilizing gas, and the seal member is formed as an airtight seal member to cause steam leaking to the airtight area from the gap, between the seal surfaces, communicating with the airtight area to increase a pressure of the airtight area and become the saturated steam, or to cause the sterilizing gas to increase a gas concentration of the airtight area to a gas concentration necessary for the sterilization.

Preferably, a discharge port to discharge water condensed in the airtight area or to discharge gas in the airtight area is formed in the casing or the surrounding member.

Preferably, a supply port to supply the sterilizing gas to the airtight area is formed in the surrounding member.

A processing apparatus of the present invention includes:

a processing equipment where to perform processing under a sterile condition;

a supply port and a discharge port for supplying and discharging sterilizing gas to/from the processing equipment;

a rotary shaft having one end inserted in the processing equipment; and the mechanical seal device according to any one of the above-described ones.

In the present invention, the mechanical seal device in which, between the processing equipment where to perform the processing under the sterile condition and the rotary shaft used with one end thereof inserted in the processing equipment from the atmosphere side, the seal parts are disposed at least at two places along a length direction of the rotary shaft seals the rotary shaft and airtightly seals the gap between the processing equipment and the atmosphere, and in order to sterilize the inside of the processing equipment and the seal parts by the supply of sterilizing gas to the sealing fluid supplied area which is a space surrounded by the rotary shaft, the casing of the mechanical seal device, and the seal parts disposed at least at two places and which is a space supplied with the sealing fluid, the airtight area is formed so that the space which communicates with the gap between the seal surfaces of the seal part located on the most downstream side in the flow direction of the sealing fluid and is on the downstream side of the gap in the flow direction of the sealing fluid is made airtight, and the sterilizing gas is supplied to the airtight area via the sealing fluid supplied area. Consequently, the atmosphere-side seal part can be easily and surely sterilized similarly to the seal part on the processing equipment side.

DESCRIPTION OF THE PREFERRED EMBODIMENTS

Figure 1:
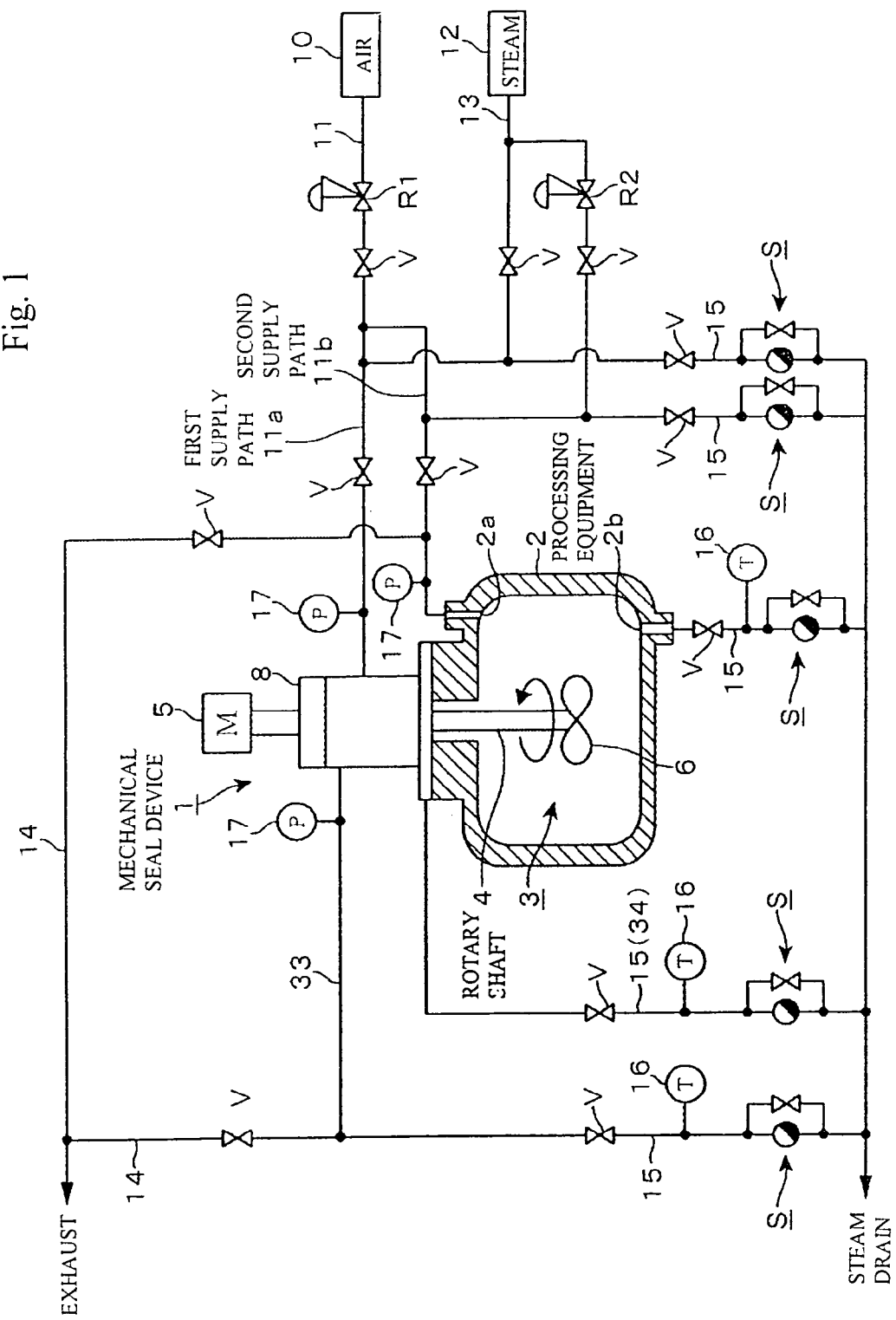
FIG. 1 is a schematic diagram showing an example of a processing apparatus of the present invention.
Figure 5:
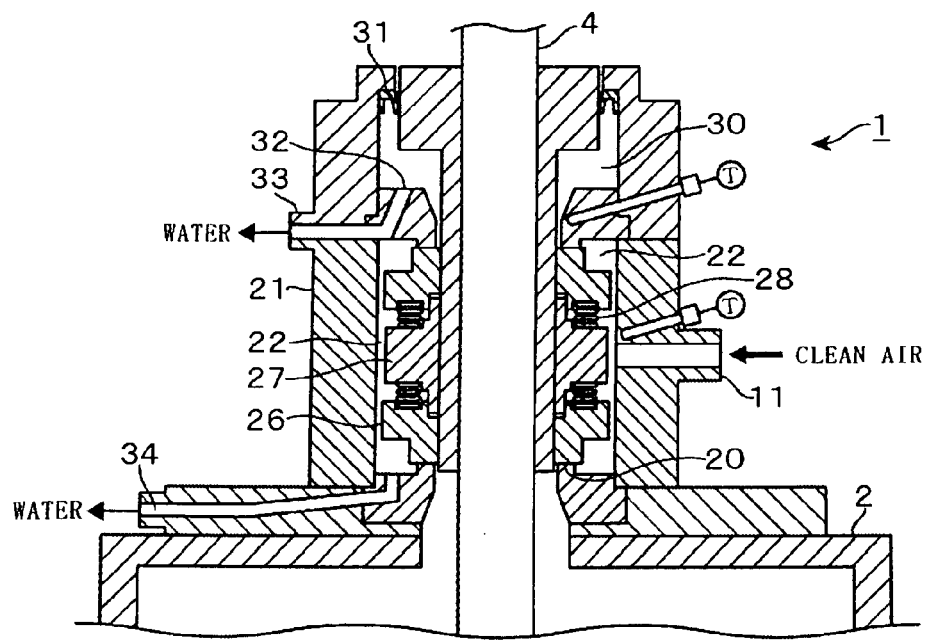
FIG. 5 is a vertical sectional view schematically showing how the mechanical seal device is sterilized.
Figure 6:
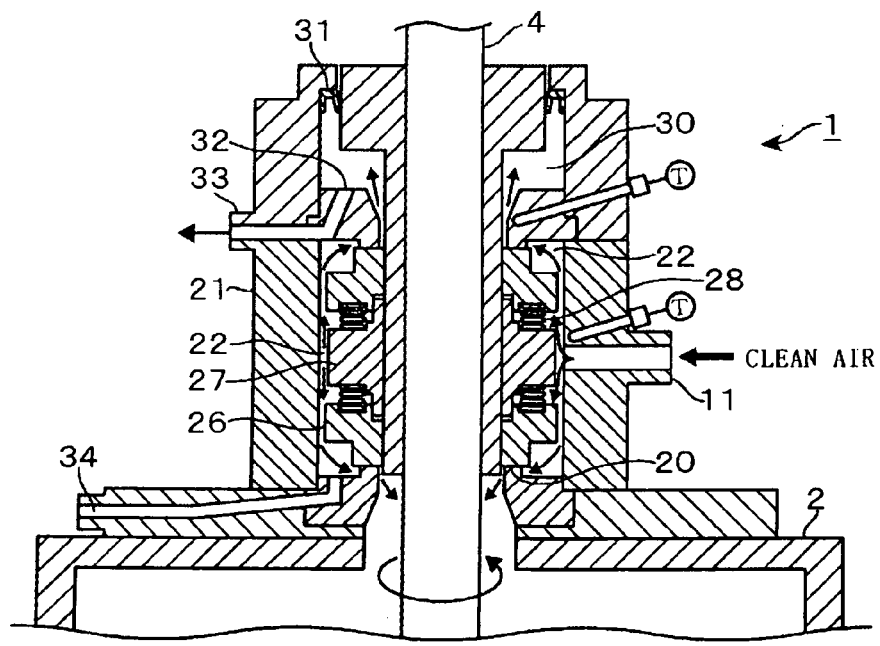
FIG. 6 is a vertical sectional view schematically showing how a rotary shaft is slidably supported in the mechanical seal device.

A processing apparatus to which a mechanical seal device 1 of the present intention is applied will be described with reference to FIG. 1. This processing apparatus is an apparatus for performing an agitation process or the like of, for example, a treatment solution or the like, and includes a processing equipment 2 for storing the treatment solution; an agitator 3 for agitating the treatment solution in the processing equipment 2; and the mechanical seal device 1 for sliding a rotary shaft 4 of the agitator 3 relative to the processing equipment 2 and for airtightly sealing a gap between the inside of the processing equipment 2 and the atmosphere. In FIGS. 1, 5 and 6 denote a rotating device such as a motor and an impeller for agitating the treatment solution which are provided on an upper end and a lower end of the rotary shaft 4 respectively. Further, 8 in FIG. 1 is a bearing stacked on an upper side of the mechanical seal device 1, and the bearing 8 supports the rotary shaft 4 in the mechanical seal device 1. Note that in FIG. 1, the rotating device 5 is depicted in a simplified manner.

This processing apparatus is an apparatus for agitating the treatment solution while preventing unwanted bacteria from getting mixed in the treatment solution, as in, for example, the preparation of an injection solution or chemical processes such as cell incubation and crystallization for obtaining sterile powder. Therefore, as will be described later, as a sealing fluid supplied to seal parts 20 (sealing fluid supplied area 22) of the mechanical seal device 1, this apparatus uses a clean sealing fluid having undergone, for to example, a filtration process, for example, clean air (sterile air) supplied from an air storage part 10 via a sealing fluid supply path 11. The sealing fluid supply path 11 extending from the air storage part 10 toward the mechanical seal device 1 branches off into two first and second supply paths 11a, 11b, which are then connected to the mechanical sealing device 1 and the processing equipment 2 respectively.

Further, the processing apparatus is structured to be capable of sterilizing an inner area of the processing equipment 2, the rotary shaft 4, and the impeller 6, and further, is also capable of sterilizing areas, inside the mechanical seal device 1, communicating with an inner atmosphere of the processing equipment 2 (the sealing fluid supply path 11, the seal parts 20, and the sealing fluid supplied area 22), for example, before applying the process to the treatment solution. In FIG. 1, 12 denotes a steam storage part storing sterilizing gas, for example, saturated steam at about 120° C. to 130° C., and the saturated steam can be supplied to the inner area of the mechanical seal device 1 and the inside of the processing equipment 2 from a steam supply path 13 via the aforesaid first supply path 11a and second supply path 11b respectively.

Exhaust lines 14 for discharging gas from the inside of the processing equipment 2 and from the inner area of the mechanical seal device 1 are connected to the aforesaid second supply path 11b and the mechanical seal device 1 (later-described drain path 33). In FIG. 1, 15 denotes water discharge lines, and in the middle of the water discharge lines 15, steam traps S for discharging condensed water in the steam flowing inside and for returning the steam to the apparatus side are provided respectively. The water discharge lines 15, 15 in which the aforesaid steam traps S are provided are also connected to the aforesaid supply paths 11a, 11b in order to prevent drain (water) from being supplied to the mechanical seal device 1 side and the processing equipment 2 side. The water discharge lines 15 connected to the mechanical seal device 1 and the processing equipment 2 are provided with temperature detecting parts 16 for measuring temperatures of the gas and the steam flowing in the water discharge lines 15. Note that the water discharge lines 15 are installed under the processing apparatus as shown in FIG. 1 to facilitate the discharge of the water.

Further, in FIG. 1, 17 denotes pressure detecting parts for measuring pressures of the gas and the steam flowing in the supply paths 11a, 11b and the drain path 33, and V denotes valves for allowing/stopping the supply of the gas and the steam. In FIGS. 1, 2a and 2b denote a supply port through which the saturated steam is supplied into the processing equipment 2 and a discharge port through which the drain (water) is discharged out of the processing equipment 2, respectively, and they are formed on an upper end and a lower end of the processing equipment 2 respectively. As will be described later, the gas in the processing equipment 2 is discharged from the exhaust line 14 via the supply port 2a and the aforesaid second supply path 11b. Further, in FIG. 1, R1, R2 denote regulators for adjusting a pressure of the clean air flowing in the sealing fluid supply path 11 and a pressure of the steam flowing in the second supply path 11b respectively.

Next, an inner structure of the above-described mechanical seal device 1 will be described with reference to FIG. 2 and FIG. 3. The mechanical seal device 1 includes a device main body 21 being a casing in a ring shape by which a sleeve 7 provided around the rotary shaft 4 is surrounded via a gap along the whole circumferential direction, and the mechanical seal device 1 is formed as a double mechanical seal having seal parts 20 arranged at two places along a length direction of the rotary shaft 4 from the processing equipment 2 side toward the atmosphere. These seal parts 20 are intervals (gaps) between pairs of seal surfaces of main body seal members 24 provided on an inner periphery of the device main body 21 and a rotary seal member 25 provided on the rotary shaft 4 (sleeve 7), and when the seal surfaces of these pairs seal relative to each other along the circumferential direction of the rotary shaft 4 (along a plane intersecting with the length direction of the rotary shaft 4), the rotary shaft 4 is capable of sliding relative to the device main body 21.

In this example, the main body seal members 24, 24 are arranged at two upper and lower places along the length direction of the rotary shaft 4 so as to extend along the whole circumference, and between these main body seal members 24, 24, the rotary seal member 25 is provided. Further, the rotary seal member 25 is composed of two pressing members 26, 26 provided to be movable up and down, a support member 27 fixed to the sleeve 7 between the pressing members 26, 26, and biasing means 28 being resilient bodies such as, for example, springs provided at a plurality of places along the circumferential direction of the rotary shaft 4 between the pressing members 26 and the support member 27, and when the seal surfaces (pressing members 26) of the rotary seal member 25 are pressed against the seal surfaces of the main body seal members 24, the rotary shaft 4 seals. The seal surfaces of the rotary seal members 25 are disposed to face, for example, opposite directions along the length direction of the rotary shaft 4, and the atmosphere-side seal surface and the seal surface on the processing equipment 2 side face the atmosphere side and the processing equipment 2 side respectively.

Further, an area formed in a ring shape by the aforesaid two seal parts 20, 20, an outer peripheral surface of the sleeve 7, and an inner peripheral surface of the device main body 21 is a sealing fluid supplied area 22, which is separated from a processing atmosphere on the processing equipment 2 side and from an atmosphere on the air atmosphere side by the seal parts 20, 20. In a wall surface, of the device main body 21, located on a lateral side of the sealing fluid supplied area 22, a sealing fluid supply port 23 for supplying the clean air and the saturated steam is opened. The air storage part 10 and the steam storage part 12 are connected to the aforesaid sealing fluid supply path 11 extending from the sealing fluid supply port 23 in a lateral direction. Therefore, when, for example, an inner pressure of the sealing fluid supplied area 22 increases as a result of being supplied with the clean air or the saturated steam, the pressing members 26 slightly separate from the main body seal members 24 against biasing forces of the aforesaid biasing means 28, so that an inner atmosphere of the sealing fluid supplied area 22 communicates with the inner atmosphere of the processing equipment 2 via the seal part 20 on the processing equipment 2 side (lower side) and communicates with an atmosphere outside the processing equipment 2 (later-described airtight area 30) via the atmosphere-side (upper) seal part 20. As described above, in this example, the sealing fluid supply port 23 also serves as a sterilizing gas supply port.

Further, in order to airtightly seal the area communicating with the sealing fluid supplied area 22 via the aforesaid atmosphere-side seal part 20, the mechanical device 1 is provided with a sealing member 38 including: a surrounding member 29 extending upward from an upper end portion of the device main body 21 all along the circumferential direction; and a pressure-resistant seal member 31 for airtightly connecting the surrounding member 29 and the sleeve 7 all along the circumferential direction to form the airtight area 30. The pressure-resistant seal member 31 is a seal member in a ring shape made of resin such as PTFE and having, for example, a substantially C-shaped vertical cross section with its lower end side center portion being opened in a substantially rectangular shape all along the circumferential direction, and by its inner peripheral edge and outer peripheral edge on a lower end side being pressed against the sleeve 7 on the inner peripheral side and against the surrounding member 29 on the outer peripheral side respectively, the pressure-resistant seal member 31 keeps the airtight area 30 airtight while sliding between the sleeve 7. Consequently, as will be described later, when the steam leaks to the airtight area 30 from the sealing fluid supplied area 22 via the atmosphere-side seal part 20, a pressure in the airtight area 30 is kept positive and the inner pressure gradually increases, so that the saturated steam is obtained.

In the main body seal member 24 on the atmosphere side, a discharge port (exhaust port) 32 for discharging the water condensed in the airtight area 30 and the clean air is formed, and the drain path 33 extending from the discharge port 32 is connected to a not-shown drain part (steam drain) by the aforesaid water discharge line 15 in which the steam trap S is provided, and is connected to a not-shown gas exhaust part by the exhaust line 14. Accordingly, out of the fluids leaking to the airtight area 30 from the sealing fluid supplied area 22, a condensate (liquid) of the steam used for the sterilization is discharged from the water discharge line 15 at the steam trap S, the steam (gas) is retained in the airtight area 30, and the clean air used for the agitation is discharged from the exhaust line 14. Further, in a lower surface of the device main body 21, one end of a discharge path 34 for discharging the water condensed in the sealing fluid supplied area 22 is opened, and the other end of the discharge path 34 is connected to the not-shown drain part by the water discharge line 15 in which the steam trap S is provided.

In the device main body 21 and the surrounding member 29, temperature measuring parts 35, 36 for measuring inner temperatures of the sealing fluid supplied area 22 and the airtight area 30 respectively are provided each at a plurality of places, for example, four places along the circumferential direction, and are capable of measuring the steam in these areas 22, 30.

Figure 4:
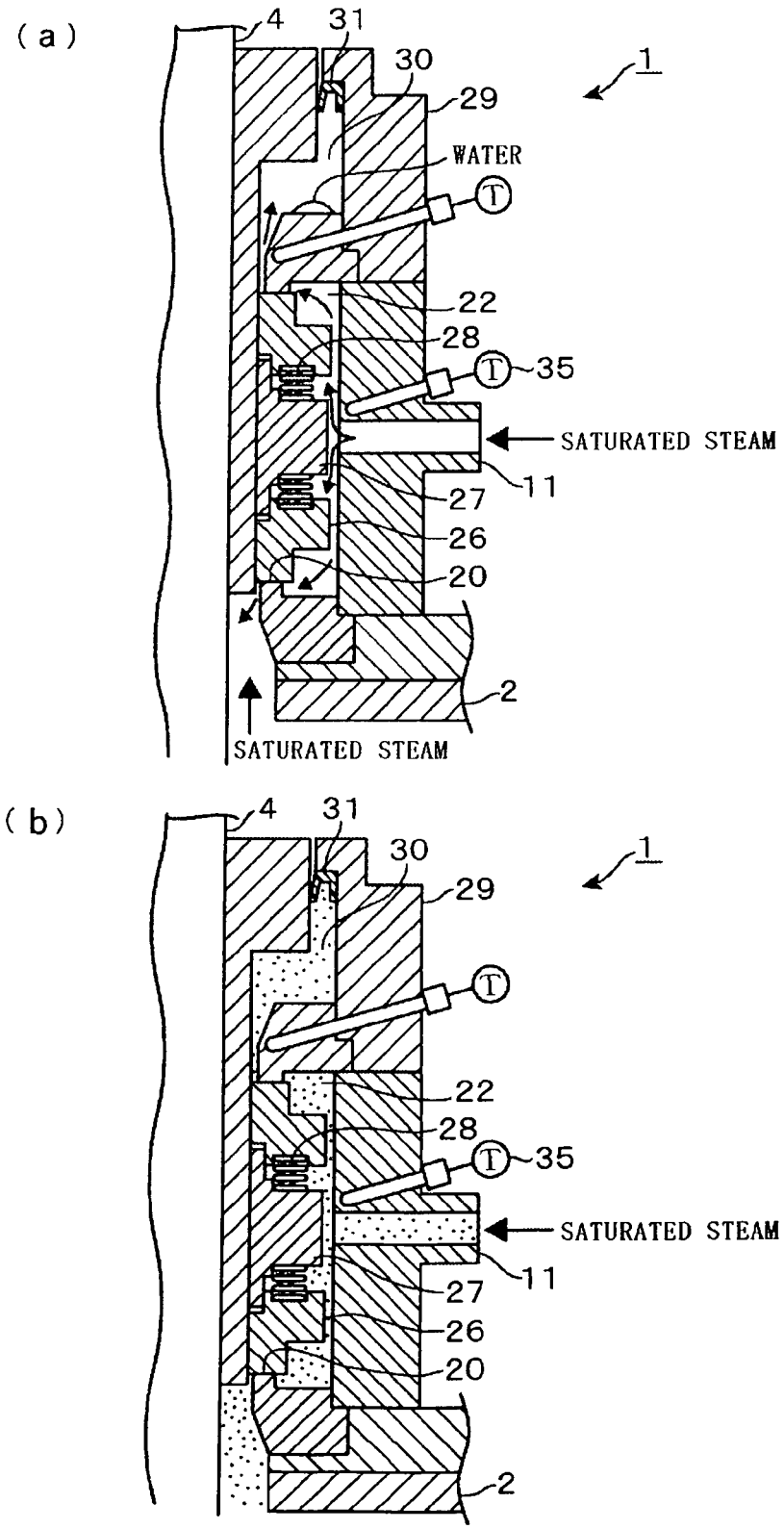
FIG. 4 are vertical sectional views schematically showing how the mechanical seal device is sterilized.

Next, the operation of the above-described processing apparatus will be described. First, a description will be given of a case where the inner area of the processing equipment 2, the rotary shaft 4, the impeller 6, and the inner area of the mechanical seal device 1 are sterilized before, for example, the agitation process is performed in this processing apparatus. First, before the treatment solution is charged into the processing equipment 2, the processing equipment 2 is made airtight, and at the same time, as shown in FIG. 4(*a*), the saturated steam is supplied into the sealing fluid supplied area 22 and the processing equipment 2 from the steam storage part 12 via the sealing fluid supply path 11. At this time, the pressure of the saturated steam supplied into the processing equipment 2 is set lower than the pressure of the steam supplied to the sealing fluid supplied area 22 within a pressure range at which the sterilization is possible, by the regulator R2 provided on the upstream side of the second supply path 11*b*. Here, the temperature and pressure of the saturated steam are appropriately set to, for example, about 121° C. or higher and about 110 kPaG (gauge) or higher respectively.

This saturated steam sterilizes the sealing fluid supply path 11, the sealing fluid supplied area 22, and the inside of the processing equipment 2. Then, when the inner pressure of the sealing fluid supplied area 22 becomes higher, the pressing members 26 slightly move toward the support member 27 as described above, and thus the seal parts 20 are opened, so that the saturated steam leaks to the processing equipment 2 and the airtight area 30 via the seal parts 20 from the sealing fluid supplied area 22. The seal part 20 on the processing equipment 2 side is supplied with the saturated steam necessary for the sterilization from the inner peripheral side (processing equipment 2 side) and the outer peripheral side (sealing fluid supplied area 22 side), so that the temperature and pressure of this saturated steam are kept and this seal part 20 is also sterilized.

Meanwhile, as for the atmosphere-side (upper) seal part 20, since the temperature and pressure in the airtight area 30 are lower than those of the sealing fluid supplied area 22, the saturated steam leaking to the airtight area 30 via this seal part 20 gradually decreases in temperature and pressure, and to become water by, for example, condensation. Then when the supply of the saturated steam to the sealing fluid supplied area 22 is continued, the steam leaking from the seal part 20 gradually increases the temperature and pressure in the airtight area 30 because the pressure-resistant seal member 31 keeps the airtight area 30 airtight, and as shown in FIG. 4(*b*), the saturated steam is obtained therein as in the sealing fluid supplied area 22. The water generated by the condensation of the steam in the airtight area 30 is discharged via the water discharge line 15 in which the steam trap S is provided. At this time, the temperature detecting parts 16 provided in the water discharge lines 15 measure the minimum guaranteed temperatures in the areas 22, 30 and the processing equipment 2, and it is confirmed whether or not the steam is saturated in the areas 22, 30 and the processing equipment 2.

Thereafter, after it is confirmed from the temperature detecting parts 16 provided in the water discharge lines 15 that the temperatures of the sealing fluid supplied area 22 and the airtight area 30 have become the temperature necessary for the sterilization, the supply of the saturated steam is continued until a predetermined sterilization time, for example, 20 minutes or more passes, so that the sterilization of the sealing fluid supply path 11, the processing equipment 2, the sealing fluid supplied area 22, the rotary shaft 4, the impeller 6, and the two seal parts 20 is completed. Here, by providing the temperature detecting parts 16 at positions apart from the mechanical seal device 1 and the processing equipment 2 and measuring the temperature of the saturated steam by the temperature detecting parts 16 as described above, it is possible to confirm that the saturated steam necessary for the sterilization is surely retained in the inner area of the mechanical seal device 1 and in the processing equipment 2.

At this time, the temperature detecting parts 16 and the pressure detecting parts 17 measure the temperature and pressure of the steam, and a supply amount, a supply time, and so on of the steam are adjusted so that the areas of the apparatus have an environment necessary for the sterilization. When the condensate (water) is left in each of the areas 22, 30 at the end of the sterilization, the water is discharged via the water discharge lines 15 by, for example, the clean air as shown in FIG. 5. Note that in the aforesaid FIG. 4, only one side (right side) of the mechanical seal device 1 is depicted.

Next, when the agitation process is performed in the processing apparatus, the rotary shaft 4 is rotated around its axis and the clean air is supplied as the sealing fluid to the sealing fluid supplied area 22 as shown in FIG. 6. In this case as well, since the inner area of the sealing fluid supplied area 22 is kept at a higher pressure than the inner pressure of the processing equipment 2, the clean air leaks to the processing equipment 2 and the airtight area 30 via the seal parts 20, but the seal parts 20, 20 on the processing equipment 2 side and the airtight area 30 side both have been surely sterilized, the entrance of unwanted bacteria into the processing equipment 2 is prevented. At this time, the clean air leaking to the airtight area 30 from the sealing fluid supplied area 22 is discharged to the exhaust line 14 via the drain path 33.

According to the above-described embodiment, the mechanical seal device 1 in which, between the processing equipment 2 where to perform the processing under the sterile condition and the rotary shaft 4 used with its one end inserted in the processing equipment 2 from the atmosphere side, the seal parts 20 are disposed at two places along the length direction of the rotary shaft 4 seals the rotary shaft 4 and makes the gap between the processing equipment 2 and the atmosphere airtight by the supply of the sealing fluid to the sealing fluid supplied area 22, and when the inside of the processing equipment 2 and the seal parts 20 are sterilized, because the airtight area 30 is formed on the atmosphere side of the atmosphere-side seal part 20 so that the area communicating with the atmosphere-side seal part 20 is made airtight all along the circumferential direction of the rotary shaft 4, the sterilizing gas supplied to the sealing fluid supplied area 22 can be airtightly kept in the airtight area 30 so as to have a positive pressure therein. Therefore, the atmosphere-side seal part 20 can be easily and surely sterilized similarly to the seal part 20 on the processing equipment 2 side. This eliminates a need to add excessive heat energy for sterilizing the atmosphere-side seal part 20, which in turn eliminates a need for the mechanical seal device 1 to have excessive heat resistance and a complicated structure, enabling the sure sterilization while reducing the apparatus cost. Further, since the atmosphere-side seal part 20 can be sterilized under the same sterilization condition as that for the inside of the processing equipment 2 and the seal part 20 on the processing equipment 2 side, it is possible to enhance reliability of the sterilization of the whole apparatus and to more clearly know the risk of unwanted bacteria and contamination.

Further, in, for example, the sterilization using the saturated steam, the use of the aforesaid pressure-resistant seal member 31 for forming the airtight area 30 instead of using a seal low in heat resistance or the like makes it possible to easily increase the pressure to obtain the saturated steam in the airtight area 30.

Figure 7:
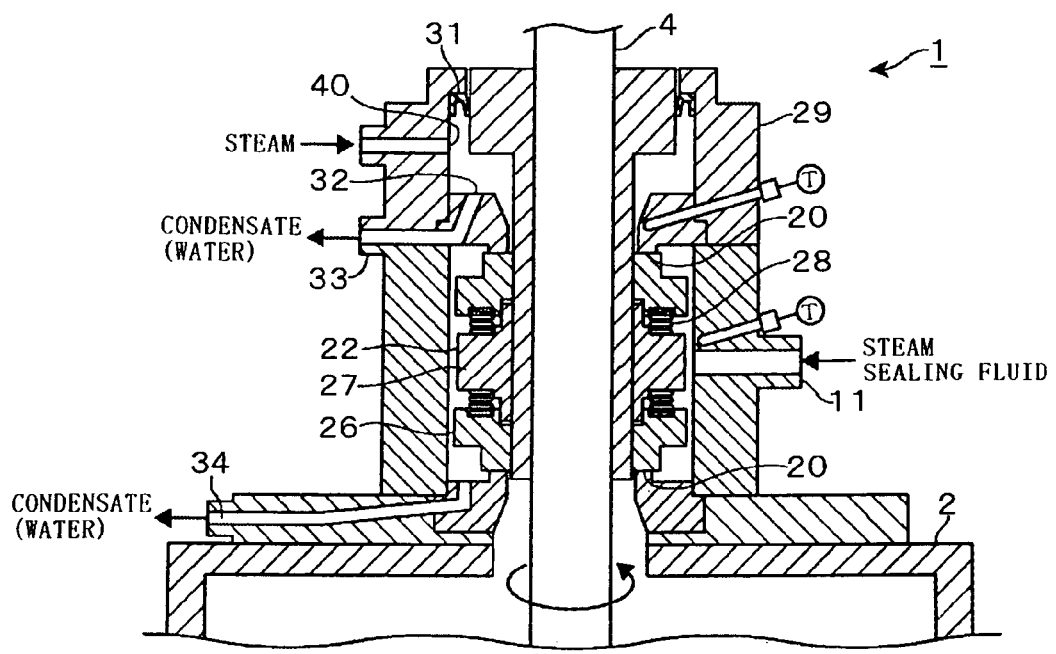
FIG. 7 is a vertical sectional view showing another example of the mechanical seal device.

Here, as shown in FIG. 7, a supply port 40 for supplying the saturated steam to the airtight area 30 may be formed in the surrounding member 29. In this case, for the sterilization of the upper seal part 20, the saturated steam is supplied also from the supply port 40 when the temperature and pressure in the airtight area 30 increase due to the leakage of the saturated steam from the sealing fluid supplied area 20 to the airtight area 30, whereby the temperature and pressure in the airtight area 30 can be quickly increased, which enables the quick sterilization.

Figure 8:
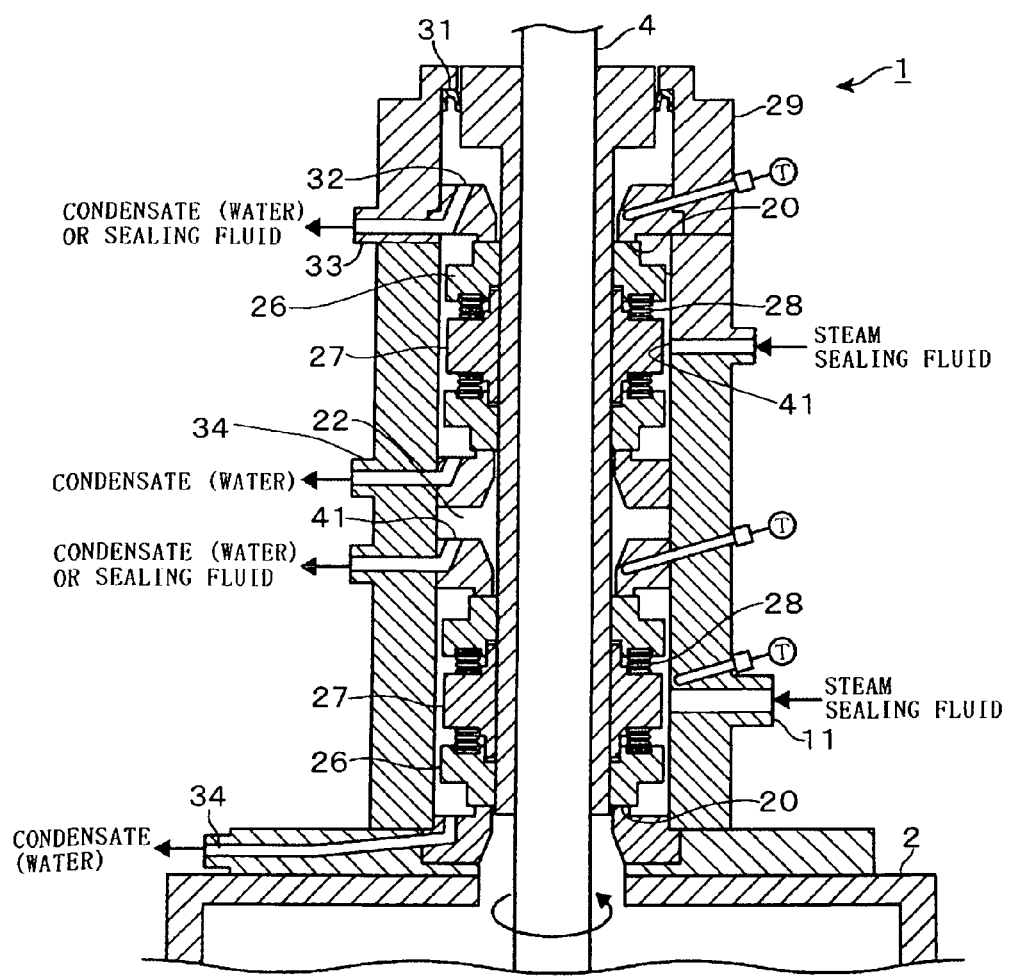
FIG. 8 is a vertical sectional view showing another example of the mechanical seal device.
Figure 9:
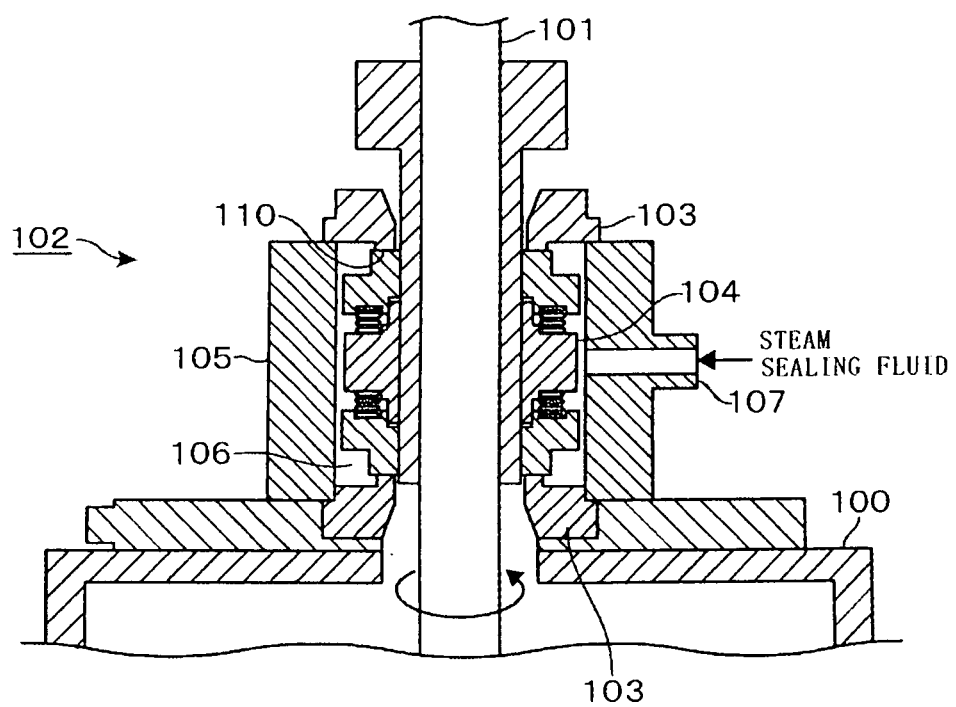
FIG. 9 is a vertical sectional view showing a conventional mechanical seal device.

Further, the seal parts 20 may be provided at two places or more, for example, at four places along the length direction of the rotary shaft 4 as shown in FIG. 8. Then, the aforesaid airtight area 30 is formed so as to cover the upper seal part 20 most distant from the processing equipment 2. In this case, a discharge port 41 for discharging the sealing fluid from the sealing fluid supplied area 22 may be formed in a wall surface, of the device main body 21, between the second seal part 20 and third seal part 20 from the processing equipment 2 side, for instance. Thus providing the seal parts 20 at four places and forming the discharge port 41 makes it possible to collect the sealing fluid supplied from a gap between the first one and second one from the processing equipment 2 side without releasing it to the atmosphere, so that an atmosphere in the sealing fluid supplied area 22 located, for example, between the first one and the second one from the processing equipment 2 side can be the same atmosphere as the atmosphere in the processing equipment 2, when a fluid that is hard to be discharged to the atmosphere because it may affect the environment, an operator, and so on, for example, a flammable fluid or the like other than the air, is used as the sealing fluid supplied to the gap between the first one and the second one from the processing equipment 2 side.

In the above-described example, the saturated steam is used as the sterilizing gas, but for example, a sterilizing gas such as a hydrogen peroxide solution, an ethylene oxide (EOG) gas, or the like may be used. In this case, the inner pressure of the airtight area 30 does not become so high that the saturated steam is obtained, or a pressure difference between the inner pressure of the airtight area 30 and the air atmosphere does not become very large, and therefore, the aforesaid pressure-resistant seal member 31 may be an airtight seal member having only a sealing capability to such a degree that the airtight area 30 can be made airtight. When any of these sterilizing gases is used, the sterilizing gas is also kept airtight in the airtight area 30 to have a predetermined pressure so that the sterilizing gas has a concentration necessary for the sterilization in the seal part 20 between the airtight area 30 and the sealing fluid supplied area 20, and therefore good sterilization is performed.

Further, as the sealing fluid, a sterile liquid may be used other than the clean air. Further, as for the seal parts 20, the mechanical seal device 1 in which the seal surfaces of the main body seal members 24 and the seal surfaces of the rotary seal member 25 are slid in contact with each other is described, but the present invention may be applied to a mechanical seal device 1 in which the seal surfaces are kept in noncontact by the sealing fluid. Furthermore, instead of the temperature measuring parts 35, 36 or in addition to the temperature measuring parts 35, 36, pressure measuring parts measuring the pressure of the steam in the areas 22, 30 may be provided. Further, a recorder may be connected to each of the aforesaid temperature detecting parts 16 to record the history of the temperature.

Figure 2:
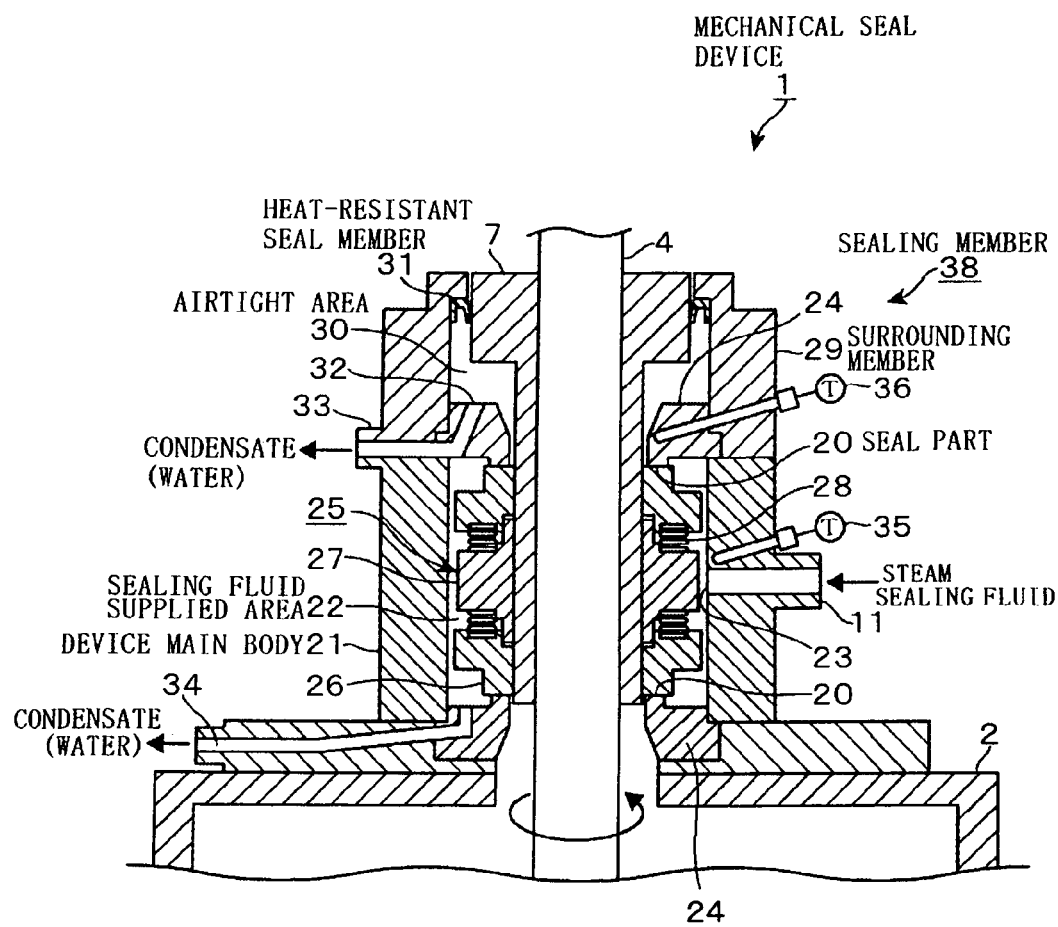
FIG. 2 is a vertical sectional view showing an example of a mechanical seal device used in the processing apparatus.
Figure 3:
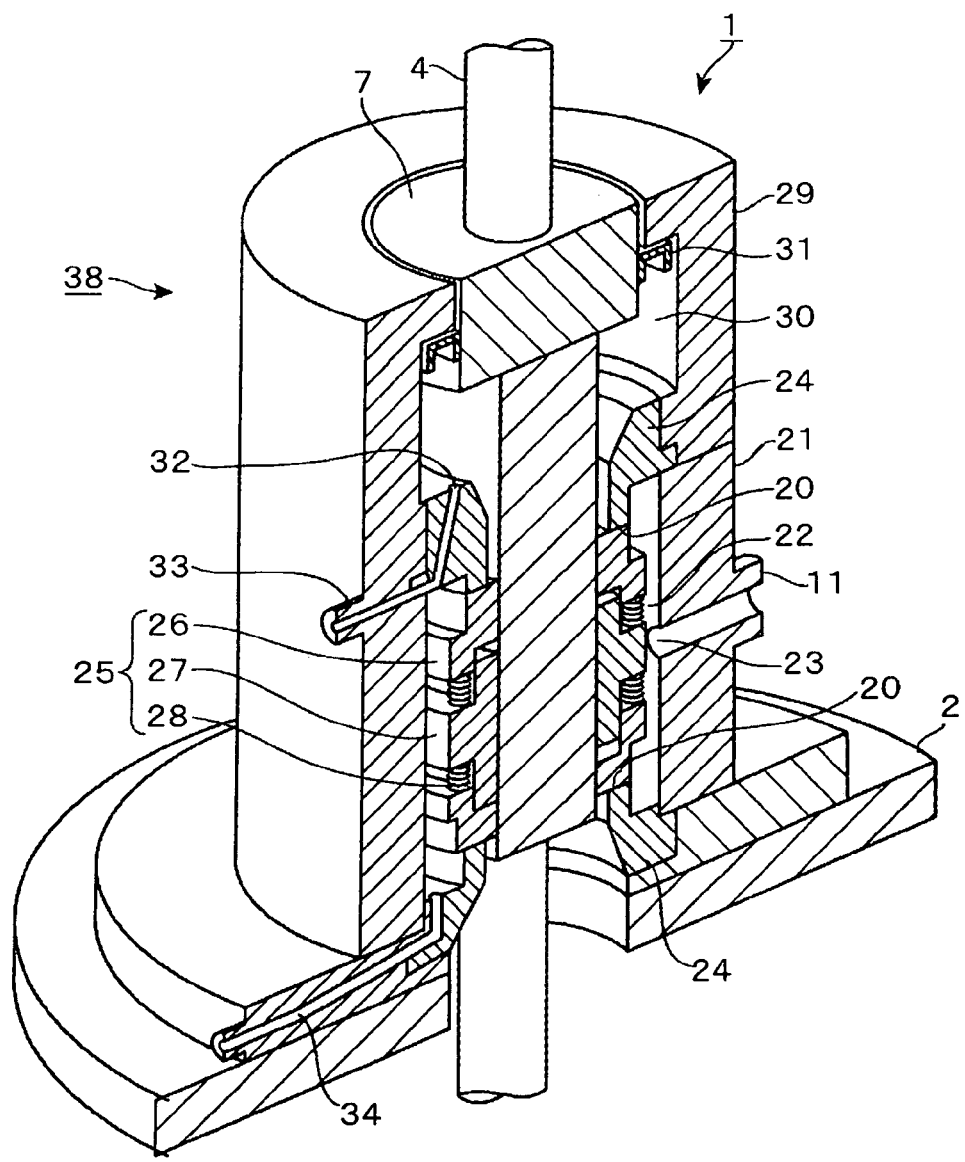
FIG. 3 is a perspective view showing an example of the mechanical seal device.

Further, in the aforesaid FIG. 2, the two seal surfaces of the rotary seal member 25 are disposed so as to face opposite directions along the length direction of the rotary shaft 4, but the seal surfaces both may be disposed so as to face the lower side or the upper side. Further, the processing apparatus whose rotary shaft 4 is inserted in the processing equipment 2 from above is described, but the rotary shaft 4 may be inserted from the lower side or from the lateral side. Furthermore, in the seal parts 20, the seal surfaces are formed to be perpendicular to the length direction of the rotary shaft 4, but another alternative structure may be that the seal surfaces are formed to make, so to speak, a "fan" shape so that they are inclined to be laterally symmetrical to each other with respect to a center axis of the rotary shaft 4 and intersect with the length direction of the rotary shaft 4.

Further, the treatment solution used for the processing in this processing apparatus may be not only liquid but also, for example, a liquid or a slurry in which particulate solids are dispersed, powder, gas, or the like.

EXPLANATION OF REFERENCES 1 mechanical seal device
2 processing equipment
3 agitator
4 rotary shaft
10 air storage part
12 steam storage part
20 seal part
21 device main body
22 sealing fluid supplied area
23 sealing fluid supply port
24 main body seal member
25 rotary seal member
29 surrounding member
30 airtight area
31 pressure-resistant seal member

The invention claimed is:

1. A mechanical seal device which seals a rotary shaft inserted in processing equipment that performs processing under a sterile condition, and which is provided between an inside of the processing equipment and an outer atmosphere, the device comprising:
a casing disposed so as to cover a periphery of the rotary shaft that projects from the processing equipment;
a first slidable sealing member comprising a rotary shaft-side seal sliding surface provided around the entire circumference of the rotary shaft, along a plane intersecting the lengthwise direction of the rotary shaft, and a first casing-side seal surface, provided along the inner circumference of the casing, which slides against the rotary shaft-side seal sliding surface;
a second slidable sealing member comprising a rotary shaft-side seal sliding surface, which is disposed at a position distanced from the processing equipment, with respect to the first sliding member, in the direction of extension of the rotary shaft, and provided around the entire circumference of the rotary shaft, along a plane intersecting the lengthwise direction of the rotary shaft, and a second casing-side seal surface, provided along the inner circumference of the casing, so to slide against this rotary shaft-side seal sliding surface;
a biasing means provided for at least one of the first slidable sealing member and the second slidable sealing member, and biased so as to press one of the rotary shaft-side seal sliding surface and the corresponding casing-side seal surface against the other seal sliding surface, in said at least one of the first slidable sealing member and the second slidable sealing member, so as to make airtight a first space surrounded by the casing, the rotary shaft, the first slidable sealing member and the second slidable sealing member;
wherein the first and second slidable sealing members are configured to move under pressure differentials against the biasing means to open gaps between the first and second slidable sealing members and the first and second casing-side seal surfaces;
a sealing fluid supply port provided in the casing to supply sealing fluid to said first space, and to let the sealing fluid flow in gaps between the rotary shaft-side slidable sealing surfaces and the casing-side sealing surfaces in each of the sliding members
a sterilizing gas supply port provided in the casing to supply saturated steam or sterilizing gas as the sterilizing gas to the first space, and to let the sterilizing gas flow in gaps between the rotary shaft-side slidable sealing surfaces and the casing-side sealing surfaces in each of the sliding members;
a sealing member which includes a surrounding member and a seal member, the surrounding member surrounding a second space, which is an area that communicates with the gap between the rotary shaft-side slidable sealing surface and the casing-side sealing surface in the second slidable sealing member and is located downstream of the gap in the flow direction of the sealing fluid toward the outer atmosphere, and the seal member sealing an opening between the surrounding member and the rotary shaft to seal off the second space from the outer atmosphere;
a discharge port opened to the second space for discharging the sealing fluid or the sterilizing gas; and
a pressure detecting part for detecting the pressure of the sterilizing gas in supply lines flowing to the first space;
wherein the second slidable sealing member is configured as an airtight seal member so that as a result of sterilizing gas in the first space leaking out to the second space via the gap between the rotary shaft-side seal sliding surface and the casing-side sealing surface in the second sliding sealing member, the second area is filled with sterilizing gas at a pre-established pressure for a pre-established set time, so as to sterilize the rotary shaft-side seal sliding surface and the casing-side seal surface in the second sliding member.

2. The mechanical seal device according to claim 1, wherein a discharge port to discharge condensed water or to discharge gas from the first space is formed in the casing or the surrounding member.

3. The mechanical seal device according to claim 1, wherein a supply port to supply the saturated steam or sterilizing gas to the first space is formed in the surrounding member.

4. The mechanical seal device according to claim 1, wherein a discharge port to discharge condensed water from the second space or to discharge gas from the second space is formed in the casing or the surrounding member.

5. The mechanical seal device according to claim 1, wherein a supply port to supply the sterilizing gas to the first space is formed in the surrounding member.

6. A processing equipment to perform processing under a sterile condition comprising:
   a supply port and a discharge port for supplying and discharging sterilizing gas to/from the processing equipment;
   a rotary shaft having one end inserted in the processing equipment and the other end in the mechanical seal device according to claim 1.

7. The mechanical seal device according to claim 1, wherein the first space is isolated from the inside of the processing equipment by said first casing-side seal surface, and said second space is isolated from said first space by said second casing-side seal surface.

8. A processing apparatus comprising:
   processing equipment that performs processing under a sterile condition;
   a supply port and a discharge port for supplying and discharging a sterilizing agent to/from the processing equipment;
   a rotary shaft having one end inserted in the processing equipment and the other end in a mechanical seal device; and
   the mechanical seal device;
   wherein the mechanical seal device comprises:
   rotary shaft-side seal surfaces disposed at least at two places apart from each other in an axial direction of the rotary shaft and each provided along a plane with the radial direction of the rotary shaft to extend along a whole circumference of the rotary shaft;
   casing-side seal surfaces which are provided along an inner circumference of a casing disposed to cover a periphery of the rotary shaft, and seal with the rotary shaft-side seal surfaces;
   a biasing means, provided for at least one pair of seal surfaces including one of the rotary shaft-side seal surfaces and a corresponding one of the casing-side seal surfaces, for biasing to press one seal surface of the pair against another seal surface of said pair to make a space between the casing and the rotary shaft airtight;
   a sealing fluid supply port provided in the casing to let a sealing fluid supplied to a first space that is between the rotary shaft and the casing and is between one pair and another pair of said at least one pair of seal surfaces and to let the sealing fluid flow in gaps between the rotary shaft-side seal surfaces and the casing-side seal surfaces;
   a supply port provided in the casing to let saturated steam or sterilizing gas be supplied to the first space between the one pair and the other pair of the at least one pair, and to let the said saturated steam or sterilizing gas flow in the gaps between the rotary shaft-side seal surfaces and the casing-side seal surfaces;
   a sealing member which includes: a surrounding member and a seal member, the surrounding member surrounding a second space that communicates with the gap between the seal surfaces of the pair among the at least one pair located on a most downstream side in a flow direction to the outer atmosphere of the sealing fluid and that is located further on the downstream side of the gap in the flow direction of the sealing fluid, and the seal member sealing an opening between the surrounding member and the rotary shaft, the surrounding member and the seal member being configured to seal off said second space from the outer atmosphere by making the second space on the downstream side an airtight area;
   a discharge port opened to the second space to discharge the sealing fluid, or the saturated steam or sterilizing gas; and
   a pressure detecting part to detect the pressure of the saturated steam or sterilizing gas; and
   wherein the seal member is configured as an airtight seal member so that said saturated steam fills the second space and sterilizes by said steam leaking to the second space from the gap between the seal surfaces, which communicates with the first space, or so that sterilizing gas fills the second space to a gas concentration for sterilizing by said sterilizing gas leaking to the second space from the gap between the seal surfaces, which communicates with the first space.

* * * * *